US012133147B2

(12) United States Patent
Ito et al.

(10) Patent No.: US 12,133,147 B2
(45) Date of Patent: Oct. 29, 2024

(54) MESSAGE TRANSFER APPARATUS AND METHOD, AND COMPUTER-READABLE MEDIUM

(71) Applicant: ACCRETE, INC., Tokyo (JP)

(72) Inventors: Akihiro Ito, Tokyo (JP); Yusei Tanaka, Tokyo (JP); Keiichi Kamikawa, Tokyo (JP)

(73) Assignee: ACCRETE, INC., Tokyo (JP)

( * ) Notice: Subject to any disclaimer, the term of this patent is extended or adjusted under 35 U.S.C. 154(b) by 754 days.

(21) Appl. No.: 17/296,207

(22) PCT Filed: Nov. 22, 2019

(86) PCT No.: PCT/JP2019/045874
§ 371 (c)(1),
(2) Date: Dec. 8, 2021

(87) PCT Pub. No.: WO2020/105738
PCT Pub. Date: May 28, 2020

(65) Prior Publication Data
US 2022/0150671 A1  May 12, 2022

(30) Foreign Application Priority Data

Nov. 23, 2018 (JP) .................. 2018-219797
Nov. 23, 2018 (JP) .................. 2018-219798

(51) Int. Cl.
*H04W 4/14* (2009.01)
*H04L 51/02* (2022.01)
*H04L 51/48* (2022.01)

(52) U.S. Cl.
CPC ............... *H04W 4/14* (2013.01); *H04L 51/02* (2013.01); *H04L 51/48* (2022.05)

(58) Field of Classification Search
CPC ......... H04W 4/08; H04W 4/12; H04W 76/10; H04W 76/40; H04W 4/14; H04L 12/14;
(Continued)

(56) References Cited

U.S. PATENT DOCUMENTS 9,078,080 B1    7/2015  Lan et al.
2005/0159144 A1*  7/2005  Hager ................. H04M 3/5322
455/519
(Continued)

FOREIGN PATENT DOCUMENTS

JP    2013-134541 A    7/2013
JP    2013-143005 A    7/2013
(Continued)

*Primary Examiner* — Matthew C Sams
(74) *Attorney, Agent, or Firm* — Fitch, Even, Tabin & Flannery LLP

(57) ABSTRACT

A message transfer apparatus is provided which comprises: an acceptance unit that accepts a client ID identifying one of a plurality of clients, a transmitted message from the client to be transmitted to a terminal, and a terminal ID identifying the terminal, the plurality of clients each belonging to one of groups each identified by a group ID; a database in which a correspondence among the group ID, the client ID, a sender ID, and the terminal ID is registered and a plurality of the sender IDs are associated with one of a plurality of the group IDs; a database control unit that updates and searches the database; a transmission unit that transmits, to the terminal identified by the terminal ID, the transmitted message to which is attached one of the plurality of sender IDs in the database associated with the group ID corresponding to the client ID; a reception unit that receives a reply message from the terminal having received the transmitted message, the reply message being a message in which the sender ID attached to the transmitted message is designated as a return destination and to which the terminal ID of the terminal is attached; and a delivery unit that delivers the reply message (Continued)

to the client identified by the client ID corresponding to a pair of the sender ID and the terminal ID registered in the database.

12 Claims, 14 Drawing Sheets

(58) Field of Classification Search
CPC ........... H04L 12/1457; H04L 2101/385; H04L 2101/65; H04L 2209/601; H04L 45/00; H04L 51/216; H04L 51/56; H04L 61/106; H04L 61/4557; H04L 61/5007; H04L 61/5069; H04L 63/0272; H04L 65/1069; H04L 65/1101; H04L 65/1104; H04L 65/4038; H04L 65/4061; H04L 9/0833; H04L 9/0838; H04L 51/48; H04L 51/02; H04M 2203/2044; H04M 15/00; H04M 15/31; H04M 15/56; H04M 15/765; H04M 15/7652; H04M 15/77; H04M 15/771; H04M 15/773; H04M 15/774; H04M 15/8016; H04M 15/8033; H04M 3/42263; H04M 3/465; H04M 3/5322; H04M 3/53375; H04M 3/56; H04M 7/0024; H04M 7/006; H04M 2215/2073; H04M 15/8077; H04M 2215/7492; H04M 15/844

See application file for complete search history.

(56) References Cited

U.S. PATENT DOCUMENTS

| | | | | |
|---|---|---|---|---|
| 2007/0136413 | A1* | 6/2007 | Ishikawa | H04L 65/1104 709/200 |
| 2008/0162929 | A1* | 7/2008 | Ishikawa | H04L 9/0838 713/160 |
| 2011/0282953 | A1* | 11/2011 | Lee | H04L 51/56 709/206 |
| 2011/0320597 | A1* | 12/2011 | South | H04L 45/00 709/225 |
| 2013/0109350 | A1 | 5/2013 | Skelton et al. | |

FOREIGN PATENT DOCUMENTS

| | | |
|---|---|---|
| JP | 5855732 B | 2/2016 |
| JP | 2017-073113 A | 4/2017 |
| JP | 2018-046531 A | 3/2018 |
| JP | 6338311 B1 | 6/2018 |

* cited by examiner (A)

| GROUP B | CLIENT c<br>CLIENT d<br>CLIENT e | SENDER ID53<br>SENDER ID54 |
|---|---|---|

(B)

| CLIENT c | SENDER ID54 | TERMINAL a |
|---|---|---|
| CLIENT c | SENDER ID53 | TERMINAL b |
| CLIENT c | SENDER ID53 | TERMINAL c |
| CLIENT c | SENDER ID53 | TERMINAL d |
| CLIENT d | SENDER ID53 | TERMINAL a |
| CLIENT d | SENDER ID54 | TERMINAL d |
| CLIENT e | SENDER ID54 | TERMINAL c |

FIG.3

| GROUP | CLIENT | SENDER ID |
|---|---|---|
| GROUP A | CLIENT a, CLIENT b | SENDER ID61 |
| GROUP B | CLIENT c, CLIENT d, CLIENT e | SENDER ID62 |
| GROUP C | CLIENT f, CLIENT g, CLIENT h, CLIENT i, CLIENT j, CLIENT k | SENDER ID63 |

(A)

(B)

(A)

| GROUP B | CLIENT c<br>CLIENT d<br>CLIENT e | SENDER ID62 |
|---|---|---|

(B)

| CLIENT c | SENDER ID62 | TIME a | TERMINAL a |
|---|---|---|---|
| CLIENT c | SENDER ID62 | TIME b | TERMINAL b |
| CLIENT c | SENDER ID62 | TIME 1 | TERMINAL c |
| CLIENT d | SENDER ID62 | TIME 3 | TERMINAL c |
| CLIENT e | SENDER ID62 | TIME 2 | TERMINAL c |
| CLIENT e | SENDER ID62 | TIME c | TERMINAL d |

FIG.7

| CLIENT m1 | SENDER ID70 | - | TERMINAL p4 |
| --- | --- | --- | --- |
| CLIENT m1 | SENDER ID70 | - | TERMINAL p5 |
| CLIENT m2 | SENDER ID70 | - | TERMINAL p1 |
| CLIENT m2 | SENDER ID70 | - | TERMINAL p3 |
| CLIENT m3 | SENDER ID70 | - | TERMINAL p0 |
| CLIENT m3 | SENDER ID70 | - | TERMINAL p7 |
| CLIENT m4 | SENDER ID70 | - | TERMINAL p2 |
| CLIENT m4 | SENDER ID70 | - | TERMINAL p6 |

(B)

TRANSMITTED MESSAGE OR REPLY MESSAGE (A)

TRANSMITTED MESSAGE (B)

MESSAGE TRANSFER APPARATUS AND METHOD, AND COMPUTER-READABLE MEDIUM

CROSS-REFERENCE TO RELATED APPLICATIONS

This application is a U.S. national phase application filed under 35 U.S.C. § 371 of International Application No. PCT/JP2019/045874, filed Nov. 22, 2019, designating the United States, which claims benefit from Japanese Application No. 2018-219798 and Japanese Application No. 2018-219797, both filed Nov. 23, 2018, the entire contents of each of which are incorporated herein by reference.

TECHNICAL FIELD

The present invention relates to a message transfer apparatus and method, and computer-readable medium.

BACKGROUND ART

There are various types of techniques for transferring media information such as a message or an image by using a network. SMS, for example, stands for Short Message Service. SMS transmission is a service that transmits a message not to an e-mail address but to the telephone number of a mobile phone or a smartphone as its destination. Early SMS has been generally called "short message service" since it transfers a short piece of text. However, with the technical development, the transferable amount of data has increased, and the transferable types of media have also become more diverse.

SMS is capable of individual message distribution and message broadcasting. Using telephone numbers, SMS can deliver messages more reliably to users whose e-mail addresses filter incoming e-mail messages. Using telephone numbers, which telecommunication carriers use as addresses, SMS is often used for personal authentication purposes as well. SMS also has a high ability to prevent spoofing and duplicate registrations.

Message communication with SMS or the like, which utilizes communication using telephone numbers as mentioned above, can identify users (actual persons) more reliably than communication using e-mail addresses or the like, which can be obtained relatively easily for free or inexpensively.

Specifically, using a telephone number usually requires payment of a charge for using a network and so on. Accordingly, a more restrict identity verification is often required to obtain a telephone number than to use an e-mail address or the like. Also, telephone numbers have been commonly used as contact information that enables secure access to the actual persons. Thus, with communication with SMS, which uses telephone numbers, or the like, actual persons can be identified more reliably than with communication using an e-mail address or the like.

However, telephone numbers have a lower degree of freedom in choice than e-mail addresses, which can be set relatively freely by the actual persons, or the like, and also obtaining one requires a certain cost in most cases. Also, Accordingly, telephone numbers have advantages over e-mail addresses or the like in terms of the reliability of message transfer, the identify verification functionality, and so on, but the telephone number resource is more limited, and the cost of obtaining one has been increasing. Moreover, the cost of transferring one message is generally higher with SMS using telephone numbers than with communication using e-mail addresses.

The above description has been given by taking SMS communication using telephone numbers as an example. It is, however, needless to say that the embodiments to be described below are not limited to SMS communication and are applicable to communication having similar characteristics to the above exemplary communication.

CITATION LIST

Patent Literature

Patent Literature 1: Japanese Patent No. 5855732

SUMMARY

An object of the disclosed embodiments is to provide an environment in which communication with SMS, which has characteristic features such as a high message delivery ability and a high identify verification ability, or the like can be used more easily without impairing these convenience features.

SOLUTION TO PROBLEM

According to the disclosed embodiments, a message transfer apparatus is provided which comprises: an acceptance unit that accepts a client ID identifying one of a plurality of clients, a transmitted message from the client to be transmitted to a terminal, and a terminal ID identifying the terminal, the plurality of clients each belonging to one of groups each identified by a group ID; a database in which a correspondence among the group ID, the client ID, a sender ID, and the terminal ID is registered and a plurality of the sender IDs are associated with one of a plurality of the group IDs; a database control unit that updates and searches the database; a transmission unit that transmits, to the terminal identified by the terminal ID, the transmitted message to which is attached one of the plurality of sender IDs in the database associated with the group ID corresponding to the client ID; a reception unit that receives a reply message from the terminal having received the transmitted message, the reply message being a message in which the sender ID attached to the transmitted message is designated as a return destination and to which the terminal ID of the terminal is attached; and a delivery unit that delivers the reply message to the client identified by the client ID corresponding to a pair of the sender ID and the terminal ID registered in the database.

The disclosed embodiments can provide an environment in which communication with SMS, which has characteristic features such as a high message delivery ability and a high identify verification ability, or similar communication can be used more easily without impairing these convenience features.

BRIEF DESCRIPTION OF DRAWINGS

FIG. 3 is a set of diagrams illustrating an example of the data structure of entries in the database.

FIG. 7 is a set of diagrams illustrating an example of the data structure of entries in the database.

DESCRIPTION OF EMBODIMENTS

The following description will be given by taking SMS communication using telephone numbers as described above as an example. It is, however, needless to say that the embodiments to be described below are not limited to SMS communication and are applicable to any types of communication having similar characteristics to the exemplary communication.

Also, the embodiments are not exclusive. It is possible to, for example, incorporate part of one embodiment in another embodiment and replace part of one embodiment with part of another embodiment.

Note that the order of the flows in the flowcharts to be exemplarily described can be changed as long as there is no contradiction. Also, a single exemplarily described flow can be executed a plurality of times at different times as long as there is no contradiction.

Also, for example, a plurality of flows can be executed simultaneously as long as there is no contradiction.

Also, some programs in the disclosed embodiments can be implemented by a versatile program, such as an operating system, or hardware. In addition, the disclosed programs may each be distributed among and executed by a plurality of pieces of hardware.

General Description of Functions in Embodiments

Figure 1:
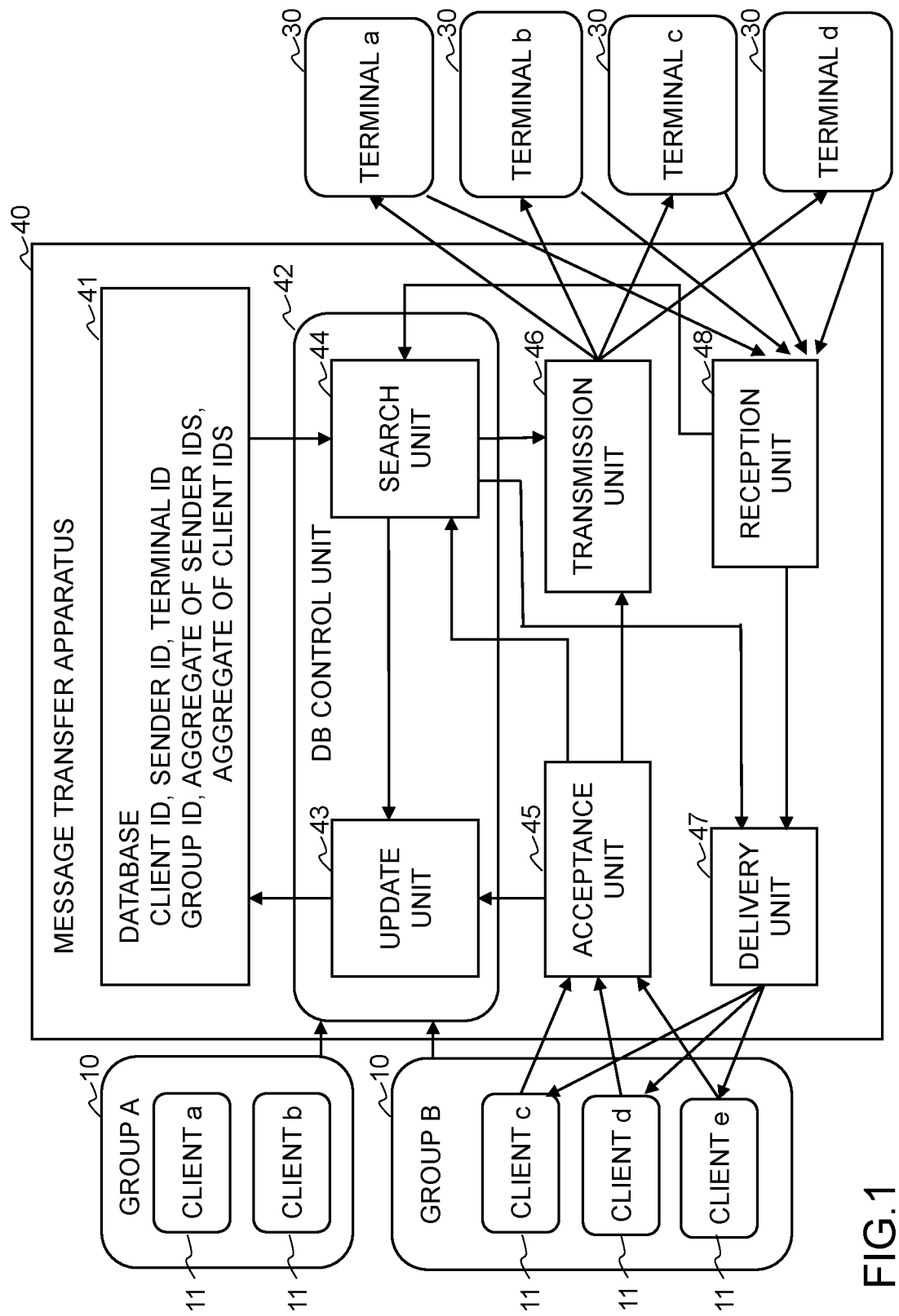
FIG. 1 is a block diagram implementing a plurality of embodiments.

FIG. 1 is a block diagram implementing a plurality of embodiments.

Clients 11 and terminals 30 exchange messages including text and the like. Mobile phones are an example of the terminals 30. A message transfer apparatus 40 transfers a transmitted message from each client 11 to one(s) of the terminals 30, and transfers a reply message from each terminal 30 to one of the clients 11.

Each of the plurality of clients 11 belongs to one of a plurality of groups 10. Note that if it is desired that a single client belong to a plurality of groups, the single client may be assigned different client IDs corresponding to the respective groups, for example.

In FIG. 1, clients a and b belong to a group A, and clients c, d, and e belong to a group B. For example, the group A may be a management company that manages a plurality of tenant enterprises, and the clients a and b may be tenants belonging to the management company. Alternatively, for example, the group A may be the parent enterprise of a franchise chain (franchisee), and the clients a and b may be independent stores participating in the franchise chain (franchisors).

In FIG. 1, the message transfer apparatus 40 has a database 41, a DB control unit 42, an acceptance unit 45 that accepts transmitted messages or the like from the clients, a transmission unit 46 that transmits the accepted transmitted messages to one(s) of the terminals 30, a reception unit 48 that receives reply messages or the like from the terminals 30, and a delivery unit 47 that delivers the reply messages to the clients 11.

Note that to each transmitted message is attached a sender ID (not illustrated in FIG. 1) indicating the transmission source. Also, to each reply message is attached a sender ID indicating the return destination. Telephone numbers serving as transmission source addresses of messages to be transmitted by the message transfer apparatus or destination addresses of reply messages received by the message transfer apparatus are an example of the sender IDs.

Also, the DB control unit 42 includes an update unit 43 that generates or updates entries in the database 41 and a search unit 44 that searches the database 41.

The database 41, for example, has entries each associating a client ID identifying a client 11, a sender ID, and a terminal ID identifying a terminal 30 with one another. The database 41 also has entries each associating a group ID, an aggregate of sender IDs, and an aggregate of client IDs with one another.

The DB control unit 42 is capable of receiving instructions from the clients 11 or the groups 10 of the clients. The clients 11 or the groups 10 of the clients are capable of editing the contents of the database 41 via generation of an entry in the database or deletion of an entry therefrom by giving an instruction to the DB control unit 42. Also, the contents of the database can be edited by including a particular character string (or command) in a message from a client 11 or a message from a terminal 30 and giving it as an instruction to the DB control unit 42. Note that specific examples of the particular character string (or command) in a message and the editing of the database 41 by a client 11 or a group 10 of clients will be described later in modifications.

Alternatively, the DB control unit 42 may be arranged such that the DB control unit performs a predetermined operation to edit the contents of the database by accepting an instruction from the user using a terminal 30 issued via a voice call addressed to a sender ID from the terminal 30 or an instruction issued via a button operation.

Alternatively, the DB control unit 42 may be arranged such that the DB control unit performs a predetermined operation to edit the contents of the database by accepting an instruction from a terminal 30 via a predetermined website. The URL of the predetermined website may be written in a transmitted message to guide the operator of the terminal 30 to the website.

First Embodiment

A first embodiment will be described with reference to FIG. 1 and also by using other drawings.

Figure 2:
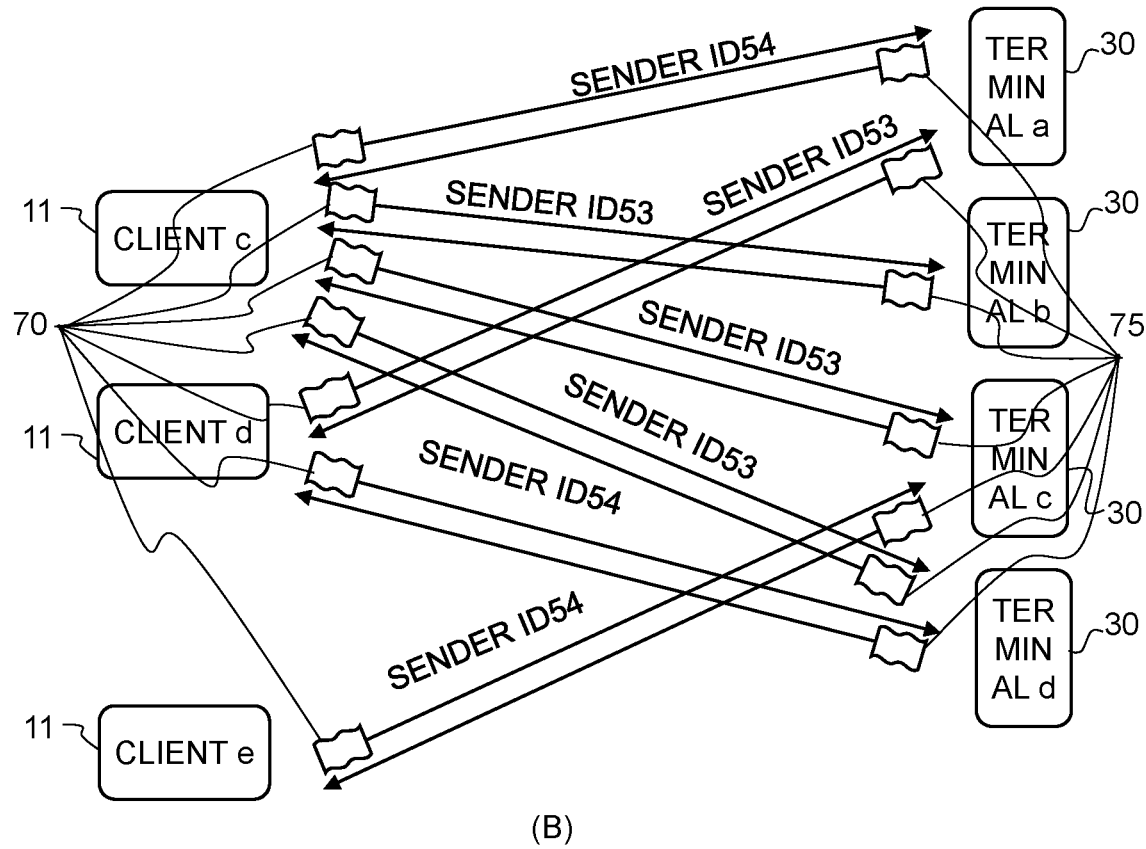
FIG. 2 is a set of diagrams illustrating an example of a database and an example of transmission and reception of messages in a first embodiment.

FIG. 2 is a set of diagrams illustrating an example of the database and an example of transmission and reception of messages in the first embodiment.

Part (A) of FIG. 2 represents an example illustrating the relationship among the groups 10, the clients 11, and sender IDs 50 in the contents of the database 41. The group A is illustrated as having the clients a and b and being capable of using sender IDs 51 and 52. The group B is illustrated as having the clients c, d, and e and being capable of using sender IDs 53 and 54. A group C is illustrated as having clients f to k and being capable of using sender IDs 55 to 58.

The following description will be given by taking the group B as an example.

Part (B) of FIG. 2 illustrates an example of transmission and reception of messages between the clients 11 and the terminals 30.

(Transmitted Messages)

The message transfer apparatus 40 has transmitted a transmitted message 70 from the client c to a terminal a with the sender ID 54 attached thereto. The update unit 43 registers an entry associating the client c, the sender ID 54, and the terminal a with one another in the database 41.

Here, at the time of transmission of a transmitted message 70 from the client d to the terminal a, the search unit 44 of the message transfer apparatus 40 checks whether an entry indicating that the client d has already transmitted a transmitted message to the terminal a in the past is present in the database 41 (if this entry is present in the database 41, the sender ID associated with the entry may be added to the transmitted message). With Part (B) of FIG. 2, it is assumed that this entry is not present. In this case, the search unit 44 checks whether an entry indicating that a transmitted message has already been transmitted to the terminal a from another client is present in the database 41. In the case of Part (B) of FIG. 2, the client c has already transmitted a transmitted message 70 to the terminal a with the sender ID 54 attached thereto. The search unit 44 thus searches for an available sender ID among the sender IDs belonging to the group B. The search unit 44 finds that the sender ID 53 has not been used for the terminal a. The search unit 44 therefore gives the sender ID 53 to the transmission unit 46. The transmission unit 46 attaches the sender ID 53 to the transmitted message 70 from the client d and transmits the transmitted message to the terminal a. The update unit 43 registers an entry associating the client d as a client ID, the sender ID 53, and the terminal a as a terminal ID with one another in the database 41.

(Reply Messages)

When the reception unit 48 of the message transfer apparatus 40 receives a reply message 75 from the terminal a with the sender ID 54 attached to the reply message 75, the search unit 44 searches the database 41. The search unit 44 searches the database 41 with the pair of the sender ID 54 and the terminal a as a terminal ID as a search key. Consequently, the search unit 44 obtains the client c as a client ID and gives the client c as a client ID to the delivery unit 47. The delivery unit delivers the reply message 75 from the terminal a to the client c.

When the reception unit 48 of the message transfer apparatus 40 receives a reply message 75 from the terminal a with the sender ID 53 attached to the reply message 75, the search unit 44 searches the database 41. The search unit 44 searches the database 41 with the pair of the sender ID 53 and the terminal a as a terminal ID as a search key. Consequently, the search unit 44 obtains the client d as a client ID and gives the client d as a client ID to the delivery unit 47. The delivery unit delivers the reply message 75 from the terminal a to the client d.

Part (B) of FIG. 2 illustrates a mode of transmission and reception of other transmitted messages 70 and reply messages 75.

In the mode of Part (B) of FIG. 2, two sender IDs are assigned to the group B. This leads to compliance with a condition that transmitted messages can be sent to each terminal 30 from clients 11 at a maximum of two locations. As long as the above condition is satisfied, each client 11 can use two sender IDs to a maximum extent to transmit transmitted messages to and receive reply messages from each terminal 30 via the message transfer apparatus 40.

Thus, while three sender IDs will be required if a dedicated sender ID is to be assigned to each of the three clients 11 in the group B in Part (B) of FIG. 2, message transmission and reception can be achieved only by assigning two sender IDs (sender IDs 53 and 54). Incidentally, various approaches to avoid inconveniences due to the above limitation will be described later. Note that a new sender ID may be added and assigned to a group experiencing inconveniences due to the above limitation in order to avoid the inconveniences.

FIG. 3 is a set of diagrams illustrating an example of the data structure of entries in the database 41.

Part (A) of FIG. 3 indicates that the clients c, d, and e belong to the group (B) and that the sender IDs 53 and 54 belong to the group B. By searching this entry, the search unit 44 can search for a group with a client ID as a key. The search unit 44 can also obtain an available sender ID with a client ID or a group ID.

Part (B) of FIG. 3 represents a plurality of entries under the group B each storing an association among a client ID, a sender ID, and a terminal ID. By searching Part (B) of FIG. 3 with a pair of a client ID and a terminal ID as a key, the search unit 44 can check whether messages have already been transmitted and received with the pair of the client ID and the terminal ID (or which sender ID has been used if messages have been transmitted and received). If it is found that no message has been transmitted or received, it is possible obtain sender IDs that have already been used for a particular terminal by further performing a search with a particular terminal ID as a key. By searching the entry in Part (A) of FIG. 3 with all sender IDs already used for the particular terminal as a key, it is possible to obtain information on whether an available sender ID is present and, if any, obtain the available sender ID.

Incidentally, it is obvious to those skilled in the art that Part (B) of FIG. 3 represents an example of entries and entries can be formed in other formats.

Figure 4:
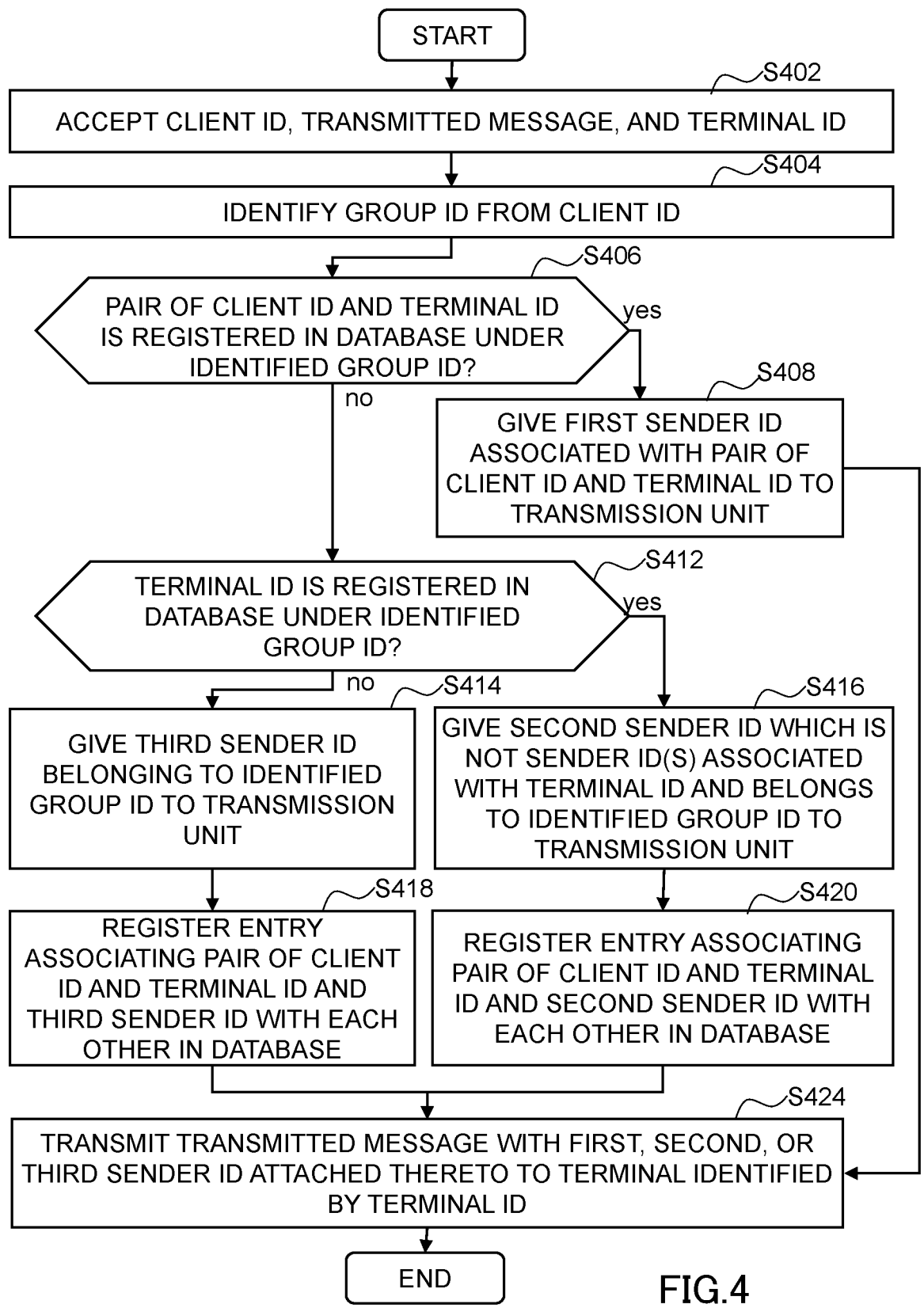
FIG. 4 is a flowchart in the first embodiment.

FIG. 4 is a flowchart in the first embodiment. An example of operation in the first embodiment will be described below using this flowchart. Note that the actor of each of the following steps is the message transfer apparatus.

[S402] A client ID, a transmitted message, and a terminal ID are accepted from a client 11. The processing proceeds to step S404.

[S404] A group ID is identified from the client ID. Note that this step does not have to be executed if the group ID is obtained from the client 11. The processing proceeds to step S406.

[S406] It is checked whether the pair of the client ID and the terminal ID is registered in the database under the identified group ID. If the result of this check is positive (yes), the processing proceeds to step S408. If the result of this check is negative (no), the processing proceeds to step S412.

[S408] A first sender ID associated with the pair of the client ID and the terminal ID is given to the transmission unit. The processing proceeds to step S424.

[S412] It is checked whether the terminal ID is registered in the database under the identified group ID. If the result of this check is positive (yes), the processing proceeds to step S416. If the result of this check is negative (no), the processing proceeds to step S414.

[S414] A third sender ID belonging to the identified group ID is given to the transmission unit. The processing proceeds to step S418.

[S416] A second sender ID which is not the sender ID(s) associated with the terminal ID and belongs to the identified group ID is given to the transmission unit. The processing proceeds to step S420.

[S418] An entry associating the pair of the client ID and the terminal ID and the third sender ID with each other is registered in the database. The processing proceeds to step S424.

[S420] An entry associating the pair of the client ID and the terminal ID and the second sender ID with each other is registered in the database. The processing proceeds to step S424.

[S424] The transmitted message with the first, second, or third sender ID attached thereto is transmitted to the terminal identified by the terminal ID.

By the above processing, even when the number of sender IDs assigned to a group 10 is less than the number of clients 11 belonging to the same group 10, it is possible to effectively use the sender IDs while minimizing the compromise of convenience.

Figure 5:
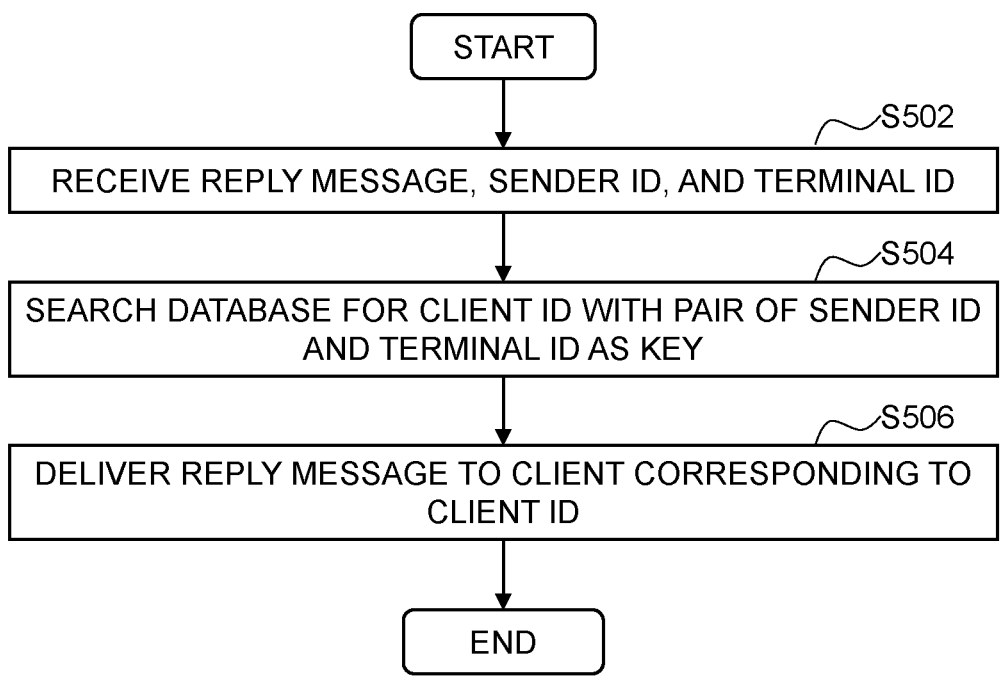
FIG. 5 is a flowchart of delivery of a reply message from a terminal to a client via a message transfer apparatus.

FIG. 5 is a flowchart of delivery of a reply message from a terminal 30 to a client via the message transfer apparatus 40. This processing will be described below. The actor of the following processing is the message transfer apparatus 40.

[S502] A reply message, a sender ID, and a terminal ID are received from the terminal 30. The processing proceeds to step S504.

[S504] The database is searched for a client ID with the pair of the sender ID and the terminal ID as a key. The processing proceeds to step S506.

[S506] The reply message is delivered to the client corresponding to the client ID.

By the above processing, a reply message with a sender ID as its destination can be delivered from a terminal 30 to the right proper client. Two-way communication of messages can be reliably performed while the clients 11 share sender IDs.

Second Embodiment

Figure 6:
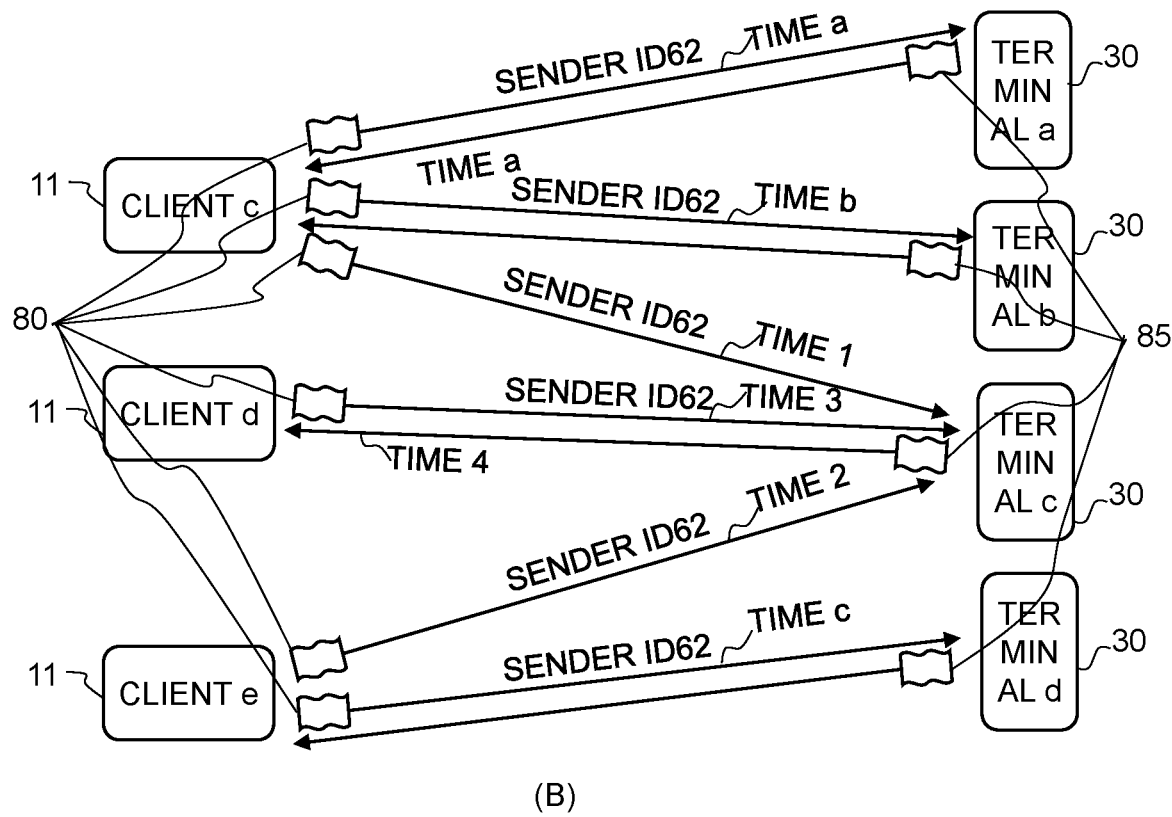
FIG. 6 is a set of diagrams illustrating an example of a database and an example of transmission and reception of messages in a second embodiment.

FIG. 6 is a set of diagrams illustrating an example of the database and an example of transmission and reception of messages in a second embodiment. A description will be given with reference to the block diagram in FIG. 1 as appropriate.

Part (A) of FIG. 6 represents an example illustrating the relationship among the groups 10, the clients 11, and sender IDs 60 in the contents of the database 41. The group A is illustrated as having the clients a and b and being capable of using a sender ID 61. The group B is illustrated as having the clients c, d, and e and being capable of using a sender ID 62. The group C is illustrated as having the clients f to k and being capable of using a sender ID 63.

The following description will be given by taking the group B as an example.

Part (B) of FIG. 6 illustrates an example of transmission and reception of messages between the clients 11 and the terminals 30.

(Transmitted Messages)

The message transfer apparatus 40 has transmitted a transmitted message 80 from the client c to the terminal c at a time 1 with the sender ID 62 attached thereto. The update unit 43 registers an entry associating the client c, the sender ID 62, the terminal c, and the time 1 with one another in the database 41.

The message transfer apparatus 40 has transmitted a transmitted message 80 from the client e to the terminal c at a time 2 with the sender ID 62 attached thereto. The update unit 43 registers an entry associating the client e, the sender ID 62, the terminal c, and the time 2 with one another in the database 41.

The message transfer apparatus 40 has transmitted a transmitted message 80 from the client d to the terminal c at a time 3 with the sender ID 62 attached thereto. The update unit 43 registers an entry associating the client d, the sender ID 62, the terminal c, and the time 3 with one another in the database 41.

Similar processes are performed for the other transmitted messages in Part (B) of FIG. 6.

(Reply Messages)

When the reception unit 48 of the message transfer apparatus 40 receives a reply message 85 from the terminal c with the sender ID 62 attached to the reply message 85, the search unit 44 searches the database 41.

With the pair of the sender ID 62 and the terminal c as a terminal ID as a search key, the search unit 44 searches the database 41 for the entry having the latest time. The latest time is the time 3. The client d as a client ID can be obtained from the entry having the sender ID 62, the terminal c as a terminal ID, and the time 3.

The client d as a client ID is given to the delivery unit 47. The delivery unit delivers the reply message 85 from the terminal c to the client d.

Part (B) of FIG. 6 illustrates a mode of transmission and reception of other transmitted messages 80 and reply messages 85.

In the mode of Part (B) of FIG. 6, one sender ID is assigned to each group. This leads to compliance with a condition that each terminal 30 can return a reply message to a client 11 at one location. Each client 11 can use one sender ID to a maximum extent to transmit transmitted messages to and receive reply messages from each terminal 30 via the message transfer apparatus 40.

Thus, while three sender IDs will be required if a dedicated sender ID is to be assigned to each of the three clients 11 in the group B in Part (B) of FIG. 6, message transmission and reception can be achieved only by assigning one sender ID (sender ID 62).

Incidentally, various other approaches to avoid inconveniences due to the above limitation will be described later. Note that a new sender ID may be added and assigned to a group experiencing inconveniences due to the above limitation in order to avoid the inconveniences. Note that in the case where a plurality of sender IDs are assigned to one group, times may be managed individually for each of the plurality of sender IDs, for example.

FIG. 7 is a set of diagrams illustrating an example of the data structure of entries in the database 41.

Part (A) of FIG. 7 indicates that the clients c, d, and e belong to the group B and that the sender ID 62 belongs to the group B. By searching this entry, the search unit 44 can search for a group with a client ID as a key. The search unit 44 can also obtain an available sender ID with a client ID or a group ID.

Figure 8:
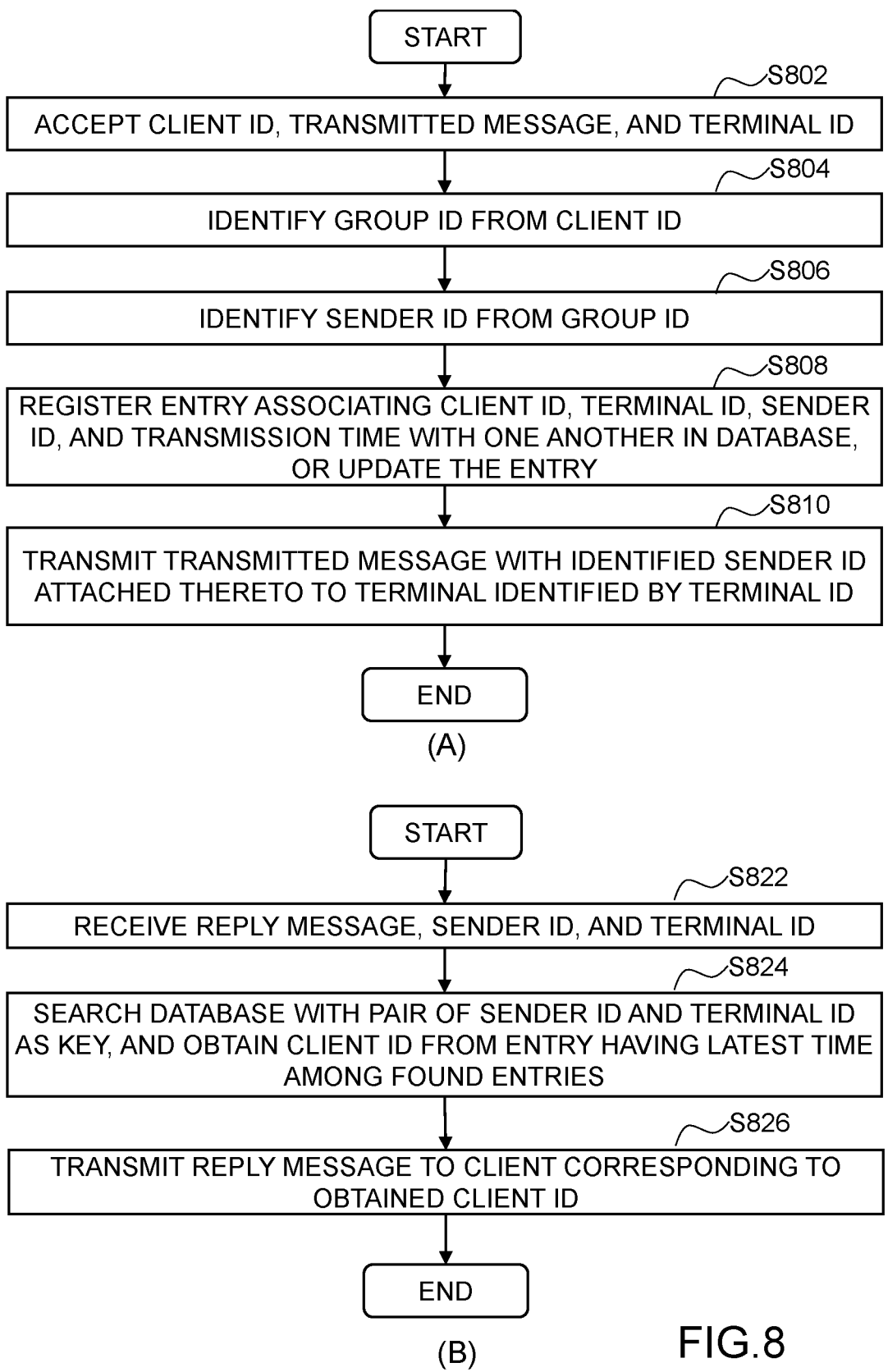
FIG. 8 is a set of flowcharts in the second embodiment.

FIG. 8 is a set of flowcharts in the second embodiment. An example of operation in the second embodiment will be described below using this flowchart. Note that the actor of each of the following steps is the message transfer apparatus.

Part (A) of FIG. 8 is a flowchart illustrating processing of a transmitted message.

[S802] A client ID, a transmitted message, and a terminal ID are accepted. The processing proceeds to step S804.

[S804] A group ID is identified from the client ID. Note that this step does not have to be executed if the group ID is obtained from the client 11. The processing proceeds to step S806.

[S806] A sender ID is identified from the group ID. The processing proceeds to step S808.

[S808] An entry associating the client ID, the terminal ID, the sender ID, and a transmission time with one another is registered in the database or updated. The processing proceeds to step S810.

[S810] The transmitted message with the identified sender ID attached thereto is transmitted to the terminal identified by the terminal ID.

Part (B) of FIG. 8 is a flowchart illustrating processing of a reply message. Its flow will be described below. The subject that executes the following processing is the message transfer apparatus.

[S822] A reply message, a sender ID, and a terminal ID are received. The processing proceeds to step S824.

[S824] The database is searched with the pair of the sender ID and the terminal ID as a key, and a client ID is obtained from the entry having the latest time among the found entries. The processing proceeds to step S826.

[S826] The reply message is delivered to the client corresponding to the obtained client ID.

By the above processing, the reply message from the terminal 30 is delivered to the client 11.

Modification 1

Figure 9:
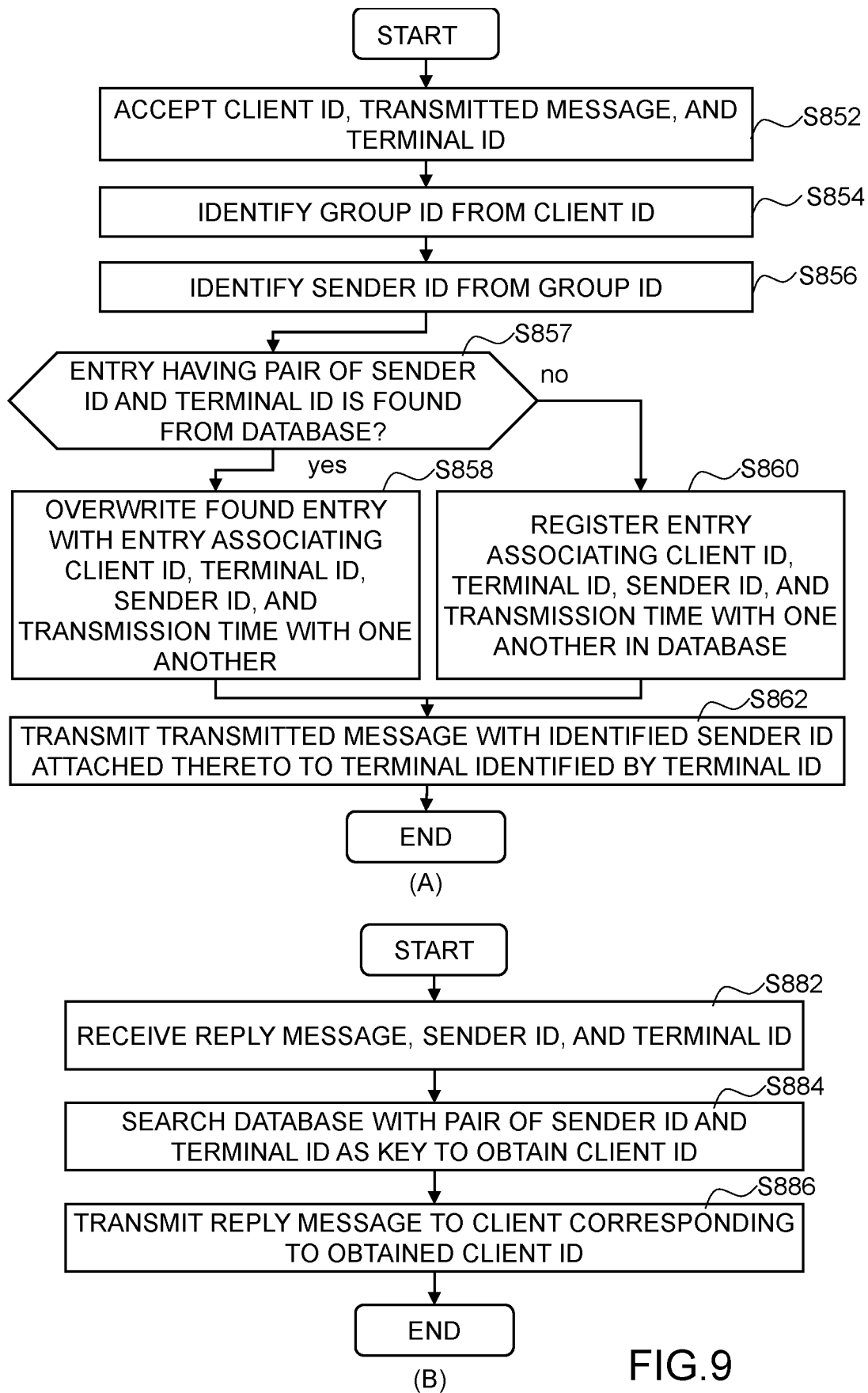
FIG. 9 is a set of flowcharts illustrating Modification 1.

FIG. 9 is a set of flowcharts illustrating Modification 1.

In FIG. 9, at the time of generating or updating a database, the database is processed such that an old entry is overwritten with an entry related to an event that has recently occurred. This can eliminate the trouble of searching for the latest entry among the plurality of entries registered in the database. Details of the processing are as follows.

(Part (A) of FIG. 9: Transmitted Message)

[S852] A client ID, a transmitted message, and a terminal ID are accepted. The processing proceeds to step S854.

[S854] A group ID is identified from the client ID. This process is not needed if the group ID can be obtained from the client. The processing proceeds to step S856.

[S856] A sender ID is identified from the group ID. The processing proceeds to step S857.

[S857] It is checked whether an entry having the pair of the sender ID and the terminal ID is found from the database. If the result of this check is positive (yes), the processing proceeds to step S858. If the result of this check is negative (no), the processing proceeds to step S860.

[S858] The found entry is overwritten with an entry associating the client ID, the terminal ID, the sender ID, and a transmission time with one another. This process may newly register the entry associating the client ID, the terminal ID, the sender ID, and the transmission time with one another after a process of deleting the found entry, instead of overwriting it. The processing proceeds to step S862.

[S860] The entry associating the client ID, the terminal ID, the sender ID, and the transmission time with one another is registered in the database. The processing proceeds to step S862.

[S862] The transmitted message with the identified sender ID attached thereto is transmitted to the terminal identified by the terminal ID.

By the above processing, at the time of generating or updating a database, the database is processed such that an old entry is overwritten with an entry related to an event that has recently occurred.

(FIG. 9(B): Reply Message)

A reply message obtained from a terminal 30 is processed as follows. Note that the actor of the following processing is the message transfer apparatus.

[S882] A reply message, a sender ID, and a terminal ID are received. The processing proceeds to step S884.

[S884] The database is searched with the pair of the sender ID and the terminal ID as a key to obtain a client ID. The processing proceeds to step S866.

[S886] The reply message is delivered to the client corresponding to the obtained client ID.

By the above processing, the reply message obtained from the terminal 30 is delivered to the client 11.

Modification 2

Figure 10:
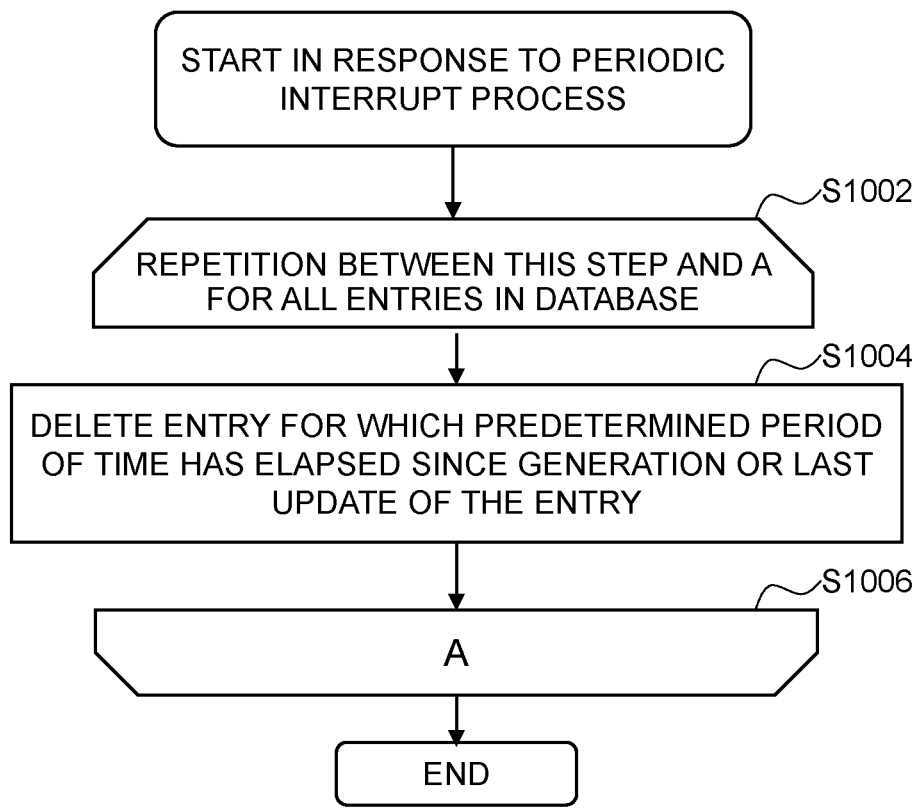
FIG. 10 is a flowchart illustrating Modification 2.

FIG. 10 is a flowchart illustrating Modification 2.

Modification 2 represents processing in which a sender ID is released from a state of being exclusively used by a client(s) 11 upon elapse of a predetermined period of time. Details of this processing are as follows.

It is desirable that the processing be started by a periodic interrupt process, for example.

[S1002] The process in step S1004 below is executed on all entries in the database.

[S1004] An entry for which the predetermined period of time has elapsed since its generation or last update is deleted. Note that the deletion target entry is an entry involved in exclusive use of a sender ID.

[S1006] A repetitive process is executed between steps S1002 and S1006.

By the above processing, a sender ID assigned to a client(s) 11 is released from the state of being exclusively used by the client(s) upon elapse of the predetermined period of time, and the sender ID becomes available to the others. This enables efficient use of sender IDs, which are resources shared among the clients 11.

Other Modifications

Figure 11:
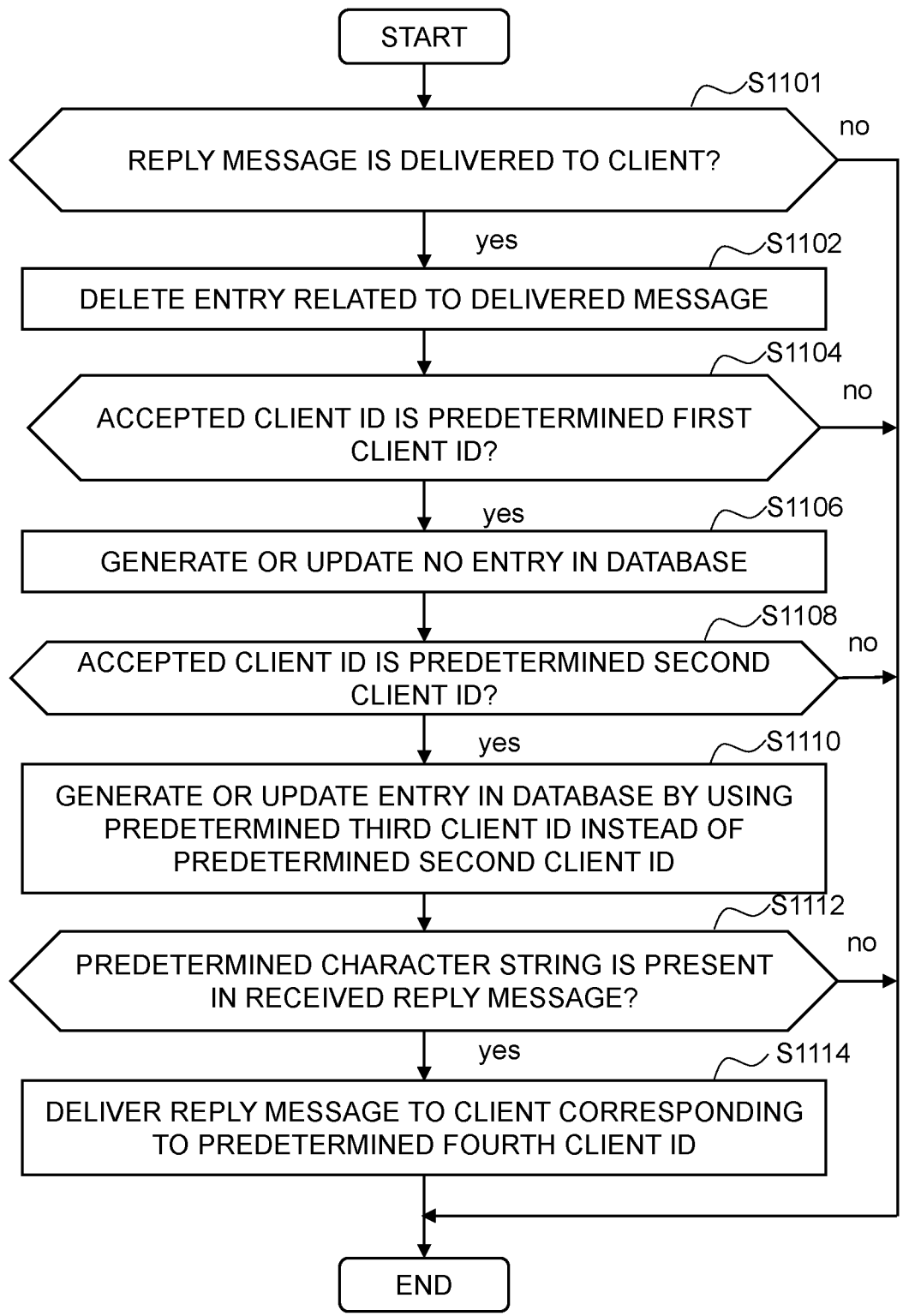
FIG. 11 is a diagram illustrating other modifications.

FIG. 11 is a diagram illustrating other modifications. Note that while FIG. 11 illustrates a series of processes, only some processes among the processes illustrated in FIG. 11 may be employed and executed.

(1) [S1101, S1102]

In this process, a process is performed in which, after allocating a sender ID and performing transmission of a transmitted message from a client 11 to a terminal 30 and delivery of a reply message from the terminal 30 to the client 11, the entry in the database related to the allocated sender ID is deleted.

By this process, the sender ID is deallocated after a single outbound and inbound message exchange, and the sender ID can therefore be assigned for another message transfer.

(2) [S1104, S1106]

In this process, when a transmitted message from a client having a predetermined client ID is accepted, a process of updating an entry in the database is not performed. This process can achieve a process meeting a need that only transmission of a transmitted message is desired and reception of a reply message is not desired. For example, the process is usable in a case where, in a franchise chain, announcement is desired to be transmitted to a terminal 30 but the transmission source of the announcement does not desire to receive a reply message, and other similar cases.

(3) [S1108, S1110]

This process is a process by which a reply message will be delivered to the client with a predetermined client ID instead of the client with the client ID used in the message transmission. By performing this process, it is possible to respond to a need of, for example, delivering reply messages from terminals 30 to a client at one location.

(4) [S1112, S1114]

This process is a process of including a predetermined character string in a reply message so that the client 11 to which to deliver the reply message can be selected. For example, when all sender IDs assigned to a certain group are in use and therefore a reply message cannot be sent from a terminal 30 to a client 11 which the reply message is desired to be sent to, this process may be used to write, in the reply message, a character string indicating that the message is desired to be delivered. In this way, it is possible to send the reply message from the terminal 30 to a client different from the delivery destination client 11 identified by the sender ID attached to the reply message.

The above various modifications can be selectively used according to the need and enable addition of various functions.

Modification 3

Figure 12:
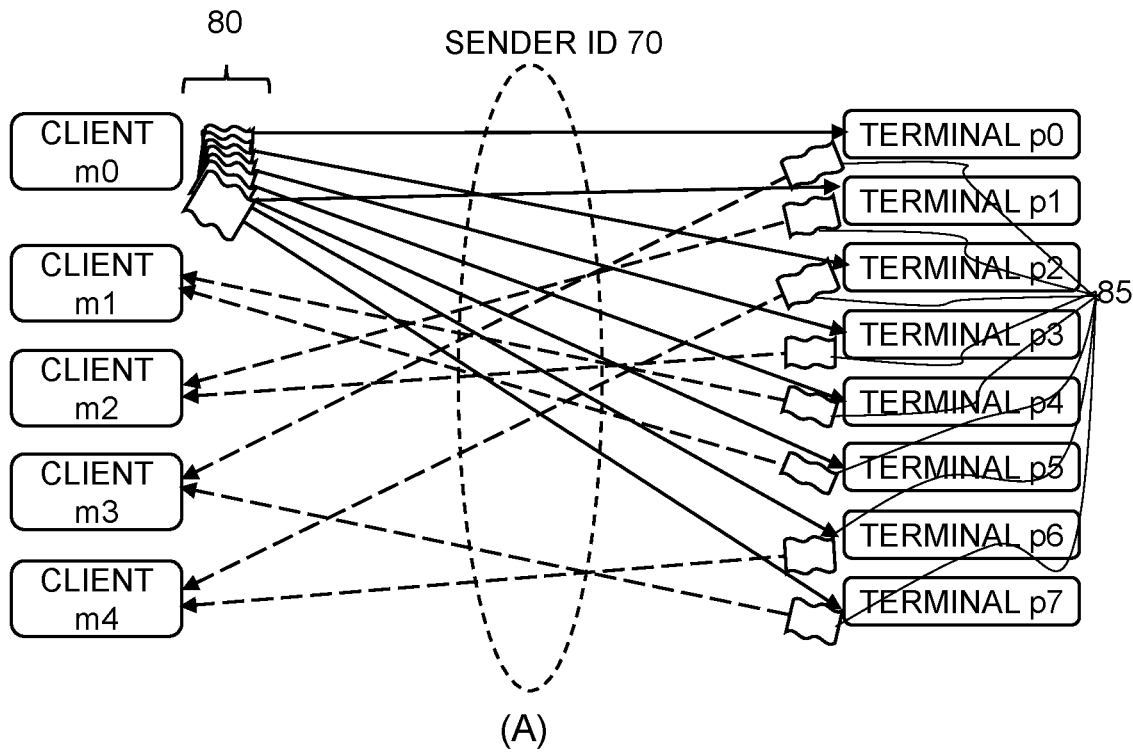
FIG. 12 is a set of diagrams illustrating Modification 3.

FIG. 12 is a set of diagrams illustrating a third modification of the embodiments. Part (A) of FIG. 12 illustrates a mode of transmission and reception of transmitted messages 80 and reply messages 85.

A client m0 broadcasts the transmitted messages 80 to terminals p0 to p7. Note that the contents of the transmitted message 80 to be sent to each terminal may be the same contents or the contents of a message different for each individual terminal. The transmitted messages 80 may be sent to the terminals with a common sender ID 70 attached thereto.

Each of the terminals p0 to p7 having received these transmitted messages 80 then returns a reply message 85 with the sender ID 70 as its destination.

Part (B) of FIG. 12 illustrates main parts of entries stored in the database 41. The entries in Part (B) of FIG. 12 may be generated in advance by an operator at the client m0 or the group to which the client m0 belongs or the like. In response to receiving the reply messages, the search unit 44 searches the entries in Part (B) of FIG. 12 stored in the database 41. As a result, as illustrated in Part (A) of FIG. 12, the reply message 85 from the terminal p0, for example, is delivered to a client m3. The other reply messages are returned to the corresponding clients illustrated in Parts (A) and (B) of FIG. 12.

As described above, in response to the client m0 broadcasting transmitted messages, reply messages from the terminals having received these messages are substantially evenly distributed among and delivered to clients m1 to m4. The entries identifying these return destination clients are illustrated in Part (B) of FIG. 12.

In this way, the clients m1 to m4 can share and handle the reply messages from the plurality of terminals.

Note that the above description has been given on the assumption that the entries in Part (B) of FIG. 12 have been generated in advance. However, the entries in Part (B) of FIG. 12 do not have to be generated in advance.

For example, when the reception unit 48 receives a reply message with the sender ID 70 as its destination from each terminal, the search unit 44 searches the database 41 with the pair of the terminal ID and the sender ID as a key. If finding no matching entry in the database, the search unit 44 instructs the update unit 43 to generate an entry. Based on this instruction, the update unit 43 adds an entry related to the terminal that issued the reply message in the database 41 related to the terminal that issued the reply message as illustrated in Part (B) of FIG. 12, for example, in accordance with a predefined rule. For example, the update unit 43 generates the entries illustrated in Part (B) of FIG. 12 to deliver the reply messages to the clients such that the numbers of reply messages will be as even as possible. The reply messages may be delivered to different clients in turn by using a round-robin algorithm, for example.

Note that the delivery pattern of reply messages to be distributed to the clients is not limited to the example illustrated in FIG. 12. For example, the entries in Part (B) of FIG. 12 may be generated in advance such that reply messages from the terminals as responses to messages transmitted from the clients will be delivered locally to, for example, a one particular client. Alternatively, each time a reply message is received from a terminal, the update unit 43 may generate a corresponding entry in Part (B) of FIG. 12.

The above modification is exemplary. A plurality of sender IDs may be used, and the associations among the clients, the sender ID, and the terminals illustrated in Part (B) of FIG. 12 can be set as needed. Note that while times are not used in Part (B) of FIG. 12, it is needless to say that the transmission-reception times of transmitted message or reply messages may be recorded in the database 41 and the message transfer may be controlled with it.

Modification 4

Figure 13:
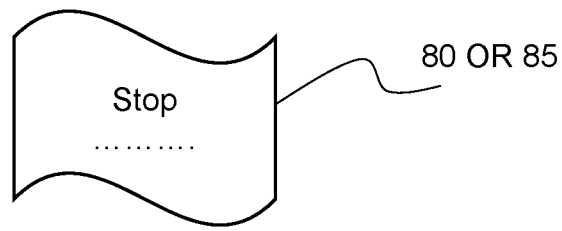
FIG. 13 is a set of diagrams illustrating Modification 4.
Figure 13:
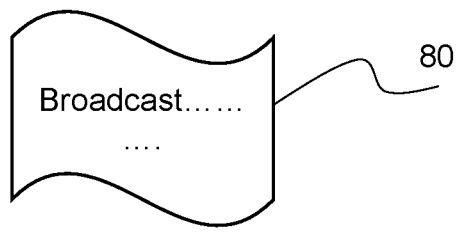

FIG. 13 illustrates another modification of the embodiments. Part (A) of FIG. 13 illustrates a case where a character string "Stop", for example, is present in a transmitted message 80 or a reply message 85. In this case, after the transmitted message or the reply message is sent, the entry in the database 41 used in the transfer of the transmitted message or the reply message may be deleted. Deleting this entry deletes the association among the client, the sender ID, and the terminal involved in the transfer of the transmitted message or the reply message. Thus, after this, no message communication can be performed between the client and the terminal associated by this deleted entry.

By including a predetermined character string in a message as above, the update unit 43 can be caused to edit the database 41.

In Part (B) of FIG. 13, a character string "Broadcast", for example, is included in a transmitted message. In this way, this transmitted message from a client can be broadcast to a plurality of terminals. In the broadcasting in Modification 3 described above, this message can be broadcast without designating the individual terminals by transmitting it from the client m0.

In addition to the above, when a predetermined message is present in a transmitted message or a reply message, it is possible to transfer it in a predetermined manner or edit a predetermined entry in the database.

Hardware Configuration

Figure 14:
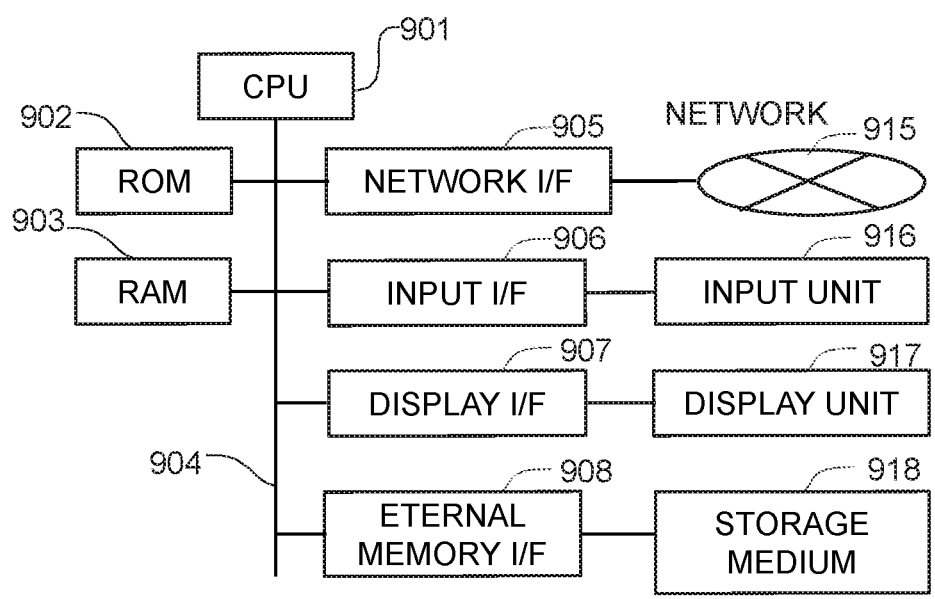
FIG. 14 is a diagram illustrating a hardware configuration in an embodiment.

FIG. 14 is a diagram illustrating a hardware configuration in an embodiment. The hardware configuration has a CPU 901, a ROM 902 storing a program and data in the present embodiment, a RAM 903, a network interface 905, an input interface 906, a display interface 907, and an external memory interface 908. These pieces of hardware are connected to one another by a bus 904.

A network 915 is connected to the network interface 905. The network 915 is a wired LAN, a wireless LAN, the Internet, a telephone network, or the like. An input unit 916 is connected to the input interface 906. A display unit 917 is connected to the display interface 907. A storage medium 918 is connected to the external memory interface 908. The storage medium 918 may be a RAM, a ROM, a CD-ROM, a DVD-ROM, a hard disk drive, a memory card, or the like. A program that implements the present embodiment can be stored in the storage medium.

The above program that implements the embodiment can be executed by a computer having the hardware configuration illustrated in FIG. 14. Also, the program in the embodiment may be implemented as a method to be executed by a computer. Part or entirety of the program in the present embodiment may be executed by an operating system. Also, part of the program may be implemented by hardware. The program may be stored in the storage medium 918, the ROM 902, or the RAM 903.

The embodiment can be implemented as a hardware apparatus.

It is needless to say that the above embodiments do not limit the invention described in the claims but are to be construed as examples.

REFERENCE SIGNS LIST

10 group
11 client
40 message transfer apparatus
41 database
42 control unit
43 update unit
44 search unit
45 acceptance unit
46 transmission unit
47 delivery unit
48 reception unit

The invention claimed is:

1. A message transfer apparatus comprising:
an acceptance unit that accepts a client ID identifying one of a plurality of clients, a transmitted message from the client to be transmitted to a terminal, and a terminal ID identifying the terminal, the plurality of clients each belonging to one of groups each identified by a group ID;
a database in which a correspondence among the group ID, the client ID, a sender ID, and the terminal ID is registered and a plurality of the sender IDs are associated with one of a plurality of the group IDs;
a database control unit that updates and searches the database;
a transmission unit that transmits, to the terminal identified by the terminal ID, the transmitted message to which is attached one of the plurality of sender IDs in the database associated with the group ID corresponding to the client ID;
a reception unit that receives a reply message from the terminal having received the transmitted message, the reply message being a message in which the sender ID attached to the transmitted message is designated as a return destination and to which the terminal ID of the terminal is attached; and
a delivery unit that delivers the reply message to the client identified by the client ID corresponding to a pair of the sender ID and the terminal ID registered in the database.

2. The message transfer apparatus according to claim 1, wherein the database control unit
searches the database with the client ID accepted by the acceptance unit or the group ID as a key and gives the sender ID corresponding to the group ID to the transmission unit, and
each time the transmitted message is transmitted, updates the correspondence among the group ID, the client ID, the sender ID, and the terminal ID used in the transmission of the transmitted message, identifies the client ID by searching the database with the pair of the sender ID and the terminal ID included in the reply message as a search key, and gives the client ID to the delivery unit.

3. The message transfer apparatus according to claim 1, wherein
the database control unit includes an update unit that updates the database and a search unit that searches the database,
the search unit performs a search to check whether a pair of the accepted client ID and the accepted terminal ID is registered in the database,
if the pair of the client ID and the terminal ID is registered, the search unit gives a first sender ID corresponding to the pair of the client ID and the terminal ID to the transmission unit,
if the pair of the client ID and the terminal ID is not registered, the search unit performs a search to check whether the terminal ID is registered in the database,
if the terminal ID is registered,
the search unit gives a second sender ID which is not a sender ID corresponding to the terminal ID and is associated with the group ID corresponding to the client ID, to the transmission unit, and
the update unit registers the pair of the client ID and the terminal ID and the second sender ID in association with each other in the database, and
if the terminal ID is not registered,
the search unit gives a third sender ID associated with the group ID corresponding to the client ID to the transmission unit, and
the update unit registers the pair of the client ID and the terminal ID and the third sender ID in association with each other in the database.

4. The message transfer apparatus according to claim 1, wherein if a predetermined period of time has elapsed since generation or update of a first entry in the database, the database control unit invalidates the first entry to thereby delete a relationship among the group ID, the client ID, the sender ID, and the terminal ID registered in the first entry from the database.

5. The message transfer apparatus according to claim 1, wherein if the reply message is delivered to the client, the database control unit invalidates a second entry used to identify the client to which to deliver the reply message, to thereby delete a relationship among the group ID, the client ID, the sender ID, and the terminal ID registered in the second entry from the database.

6. The message transfer apparatus according to claim 1, wherein if the client ID accepted by the acceptance unit is a predetermined first client ID, then, even when the transmitted message is transmitted, the database control unit does not generate or update an entry in the database which associates the group ID, the client ID, the sender ID, and the terminal ID with one another that are used in the transmission of the transmitted message.

7. The message transfer apparatus according to claim 1, wherein if the client ID accepted by the acceptance unit is a predetermined second client ID, the database control unit generates or updates an entry in the database which associates the group ID, the sender ID, the terminal ID that are used in the transmission of the transmitted message, and a predetermined third client ID, instead of the predetermined second client ID that is used in the transmission of the transmitted message, with one another.

8. The message transfer apparatus according to claim 1, wherein the database control unit gives a fourth client ID to the delivery unit if a predetermined character string is detected from the reply message.

9. A message transfer method comprising:
   an accepting a client ID identifying one of a plurality of clients, a transmitted message from the client to be transmitted to a terminal, and a terminal ID identifying the terminal, the plurality of clients each belonging to one of groups each identified by a group ID;
   controlling a database for updating and searching a database in which a relationship among the group ID, the client ID, a sender ID, and the terminal ID is registered and a plurality of the sender IDs are associated with one of a plurality of the group IDs;
   transmitting, to the terminal identified by the terminal ID, the transmitted message to which is attached one of the plurality of sender IDs in the database associated with the group ID corresponding to the client ID;
   receiving a reply message from the terminal having received the transmitted message, the reply message being a message in which the sender ID attached to the transmitted message is designated as a return destination and to which the terminal ID of the terminal is attached; and
   delivering the reply message to the client identified by the client ID corresponding to a pair of the sender ID and the terminal ID registered in the database.

10. The message transfer method according to claim 9, wherein the controlling includes
   searching the database with the client ID accepted by the accepting or the group ID as a key and giving the sender ID corresponding to the group ID to the transmitting, and
   each time the transmitted message is transmitted, updating the correspondence among the group ID, the client ID, the sender ID, and the terminal ID used in the transmission of the transmitted message, identifying the client ID by searching the database with the pair of the sender ID and the terminal ID included in the reply message as a search key, and gives the client ID to the delivering.

11. The message transfer method according to claim 9, wherein
   the controlling includes updating the database and a search step of searching the database,
   the searching includes performs a search to check whether a pair of the accepted client ID and the accepted terminal ID is registered in the database,
   upon determining the pair of the client ID and the terminal ID is registered, the searching gives a first sender ID corresponding to the pair of the client ID and the terminal ID to the transmitting,
   upon determining the pair of the client ID and the terminal ID is not registered, the searching performs a search to check whether the terminal ID is registered in the database,
   upon determining the terminal ID is registered,
      the searching gives a second sender ID which is not a sender ID corresponding to the terminal ID and is associated with the group ID corresponding to the client ID, to the transmitting, and
      the updating registers the pair of the client ID and the terminal ID and the second sender ID in association with each other in the database, and
   upon determining the terminal ID is not registered,
      the searching gives a third sender ID associated with the group ID corresponding to the client ID to the transmitting, and
      the updating registers the pair of the client ID and the terminal ID and the third sender ID in association with each other in the database.

12. A non-transitory computer-readable medium storing a program, when executed by a computer, causing a computer to execute the method according to claim 9.

* * * * *